United States Patent [19]

McDougall

[11] Patent Number: 5,172,880

[45] Date of Patent: Dec. 22, 1992

[54] HOLDER FOR A BLOW DRYER OR OTHER APPLIANCE

[75] Inventor: John G. McDougall, Kowloon, Hong Kong

[73] Assignee: China Pacific Trade Limited, British Virgin Isls.

[21] Appl. No.: 647,061

[22] Filed: Jan. 29, 1991

[51] Int. Cl.⁵ ............................................ F16M 11/10
[52] U.S. Cl. ..................................... 248/185; 248/286
[58] Field of Search .............. 248/185, 664, 105, 106, 248/124, 130, 133, 397, 313, 316.4, 315, 286

[56] References Cited

U.S. PATENT DOCUMENTS

| | | | |
|---|---|---|---|
| 135,924 | 2/1873 | Lyon | 248/397 |
| 388,788 | 8/1988 | Prescott | 248/185 |
| 836,864 | 11/1906 | Cole | 248/185 |
| 1,165,840 | 12/1915 | Brutus | 248/313 |
| 2,063,554 | 12/1936 | Meyerson | 248/106 |
| 2,316,290 | 4/1943 | Schenbeck | 248/316.4 |
| 4,023,761 | 5/1977 | Molis | 248/313 |
| 4,225,106 | 9/1980 | Eplan | 248/314 |
| 4,466,203 | 8/1984 | Thomas | |
| 4,673,148 | 6/1987 | Oliver | |
| 4,712,313 | 12/1987 | Gettleman | |
| 4,746,090 | 5/1988 | Hamilton | |

*Primary Examiner*—Blair M. Johnson
*Attorney, Agent, or Firm*—Burns, Doane, Swecker & Mathis

[57] ABSTRACT

The holder consists of a base, a support arm, and an open frame member for receiving the barrel of the blow dryer. The blow dryer is secured in position by retracting a spring loaded gripping member, inserting the barrel of the blow dryer or other appliance, and then releasing the gripping member so that it engages the barrel. The open frame member is shaped so as to taper in the direction away from the gripping arm so that the barrel is gripped at three contact points. The base includes a weight which serves as ballast. The holder is simple and easy to use, and can be used with a variety of different models of blow dryer. The holder can also be used for other appliances.

4 Claims, 4 Drawing Sheets

HOLDER FOR A BLOW DRYER OR OTHER APPLIANCE

FIELD OF THE INVENTION

The present invention relates to holders for blow dryers which allow the blow dryers to be used with hands free for styling purposes. The holders may be used for other appliances also, for example to hold lamps.

RELATED ART

Holders for blow dryers are well-known. Examples are described in U.S. Pat. Nos. 4,746,090 to Hamilton, 4,712,313 to Gettleman, 4,673,148 to Oliver, 4,466,203 to Thomas, and 4,225,106 to Eplan. There are many other examples.

The known holders suffer from various disadvantages. Some of the known holders can be used in relation to only one particular model of blow dryer. Some of the known holders are required to be fixedly mounted to a wall, table, chair or elsewhere. Some of the known holders are large and cumbersome and cannot be folded up when not in use, or easily carried when travelling. Some of the known holders require operation of nuts, bolts, screws, straps and the like when fitting the blow dryer in the holder.

SUMMARY OF THE INVENTION

One object of the present invention is to provide a universal holder, that is to say a holder which can hold any one of a variety of different blow dryers, and in particular can hold most of the commercially available light weight portable handheld electrically powered domestic blow dryers for use in styling hair. A second object of the invention is to provide a holder which can be easily used, stored and transported, and in particular can be readily transported by a person travelling or on vacation.

The invention provides a holder for a blow dryer or other appliance comprising a base, an support arm extending from the base, an open frame member on the support arm for receiving the barrel of the blow dryer or other appliance, and a gripping member for projecting into the open frame member so as to grip the barrel and hold it in position in the open frame member, the gripping member being retractable to allow insertion of the barrel.

DETAILED DESCRIPTION OF THE PREFERRED EMBODIMENTS

Figure 1:
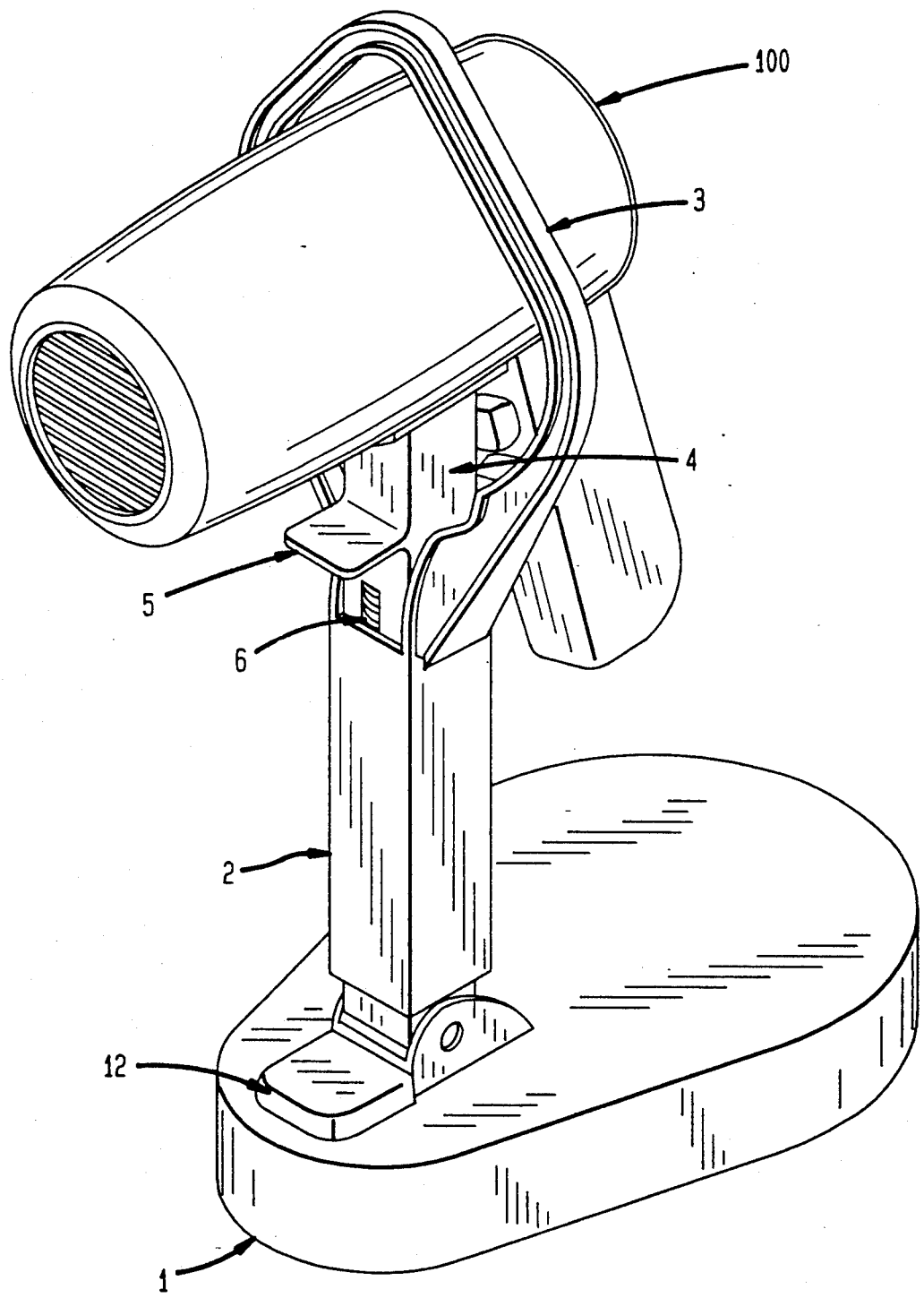
FIG. 1 is a perspective view of the holder with a blow dryer fitted in position.

The holder comprises a base 1, a support arm 2 extending from the base, an open frame 3 at the other end of the support arm for receiving the barrel of a blow dryer 100, and a gripping arm 4 for holding the barrel in position.

Figure 2:
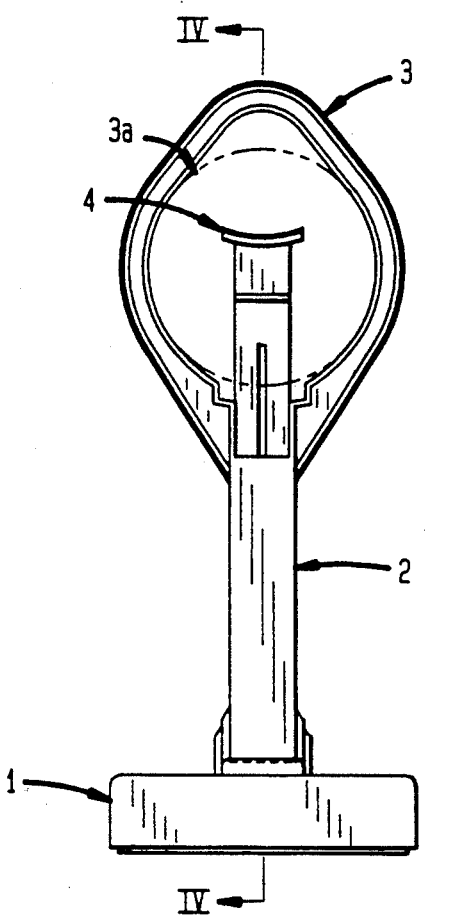
FIG. 2 is a front elevation of the holder.

In use the holder is placed on a table or other flat surface as shown in FIG. 1, the handle 5 is depressed downwardly to retract the gripping arm 4 against the action of the spring biasing mechanism 6 from the extended position shown in FIG. 2 to the retracted position. The handle 5 is held in this depressed position. The barrel of the blow dryer 100 is then inserted into the open frame 3. The handle 5 is then released and the gripping arm 4 moves upwardly under the action of the spring biasing mechanism 6 into engagement with the barrel, and then pushes the barrel upwardly against the upper limbs 3a, 3b of the open frame 3.

It will be noted that the distance between the upper limbs 3a, 3b tapers in the direction away from the retractable arm 4. The barrel is engaged by the gripping arm and by each of the two upper limbs 3a, 3b. It will be appreciated that the three-point engagement gives a good firm grip which is desirable in view of the very smooth curved surfaces of most conventional commercially available blow dryers. It will also be appreciated that the holder can be used in connection with blow dryers of a variety of different sizes and shapes and in particular can be used in connection with most conventional commercially available models of portable hand held electrically powered blow dryers for the hair.

To enable the holder to be used in the free standing mode on a table, desk or other horizontal surface, the base 1 includes a weight 7 which serves as ballast to prevent the holder toppling over under the weight of the blow dryer or moving on the horizontal surface due to the vibration of the blow dryer when operational.

Alternatively, the holder may be used in a wall mounted mode and for this purpose base 1 includes a key hole shaped slot 14 in the underneath wall thereof to allow the base to be conveniently mounted on a screw head projecting from a wall.

The support arm 2 may be set at any one of a number of different operational inclinations. In FIG. 2 the vertical inclination is shown in full lines and the other possible operational inclinations are shown in dashed lines.

Figure 3:
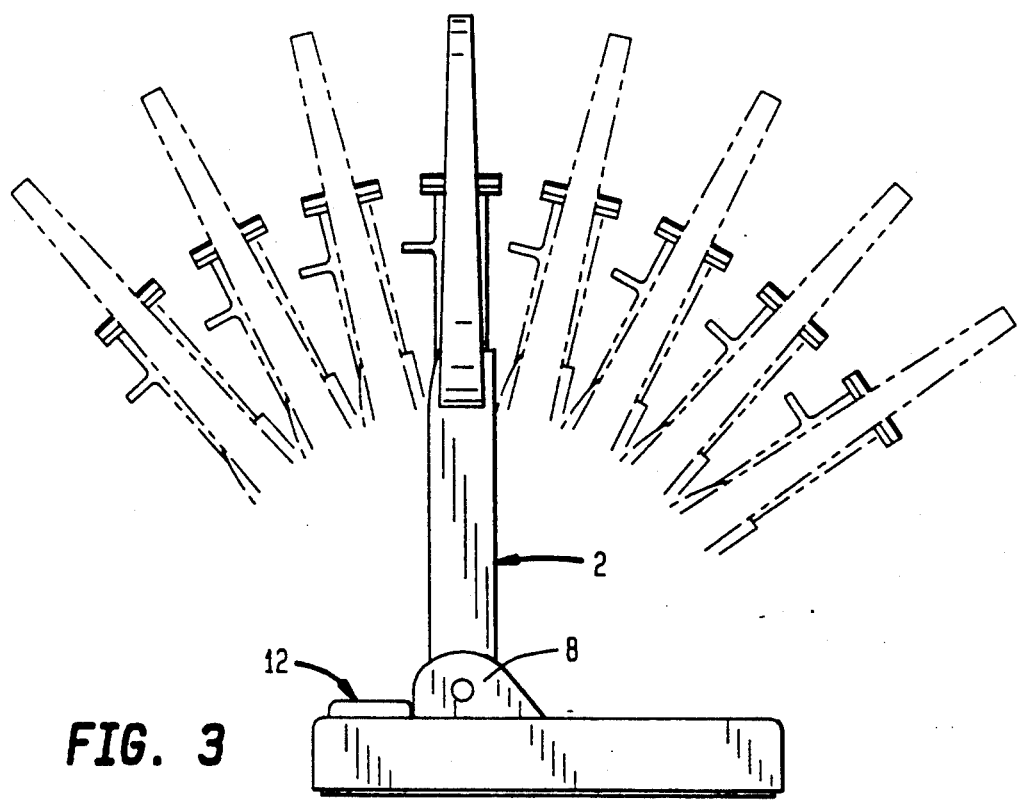
FIG. 3 is a side elevation of the holder.
Figure 4:
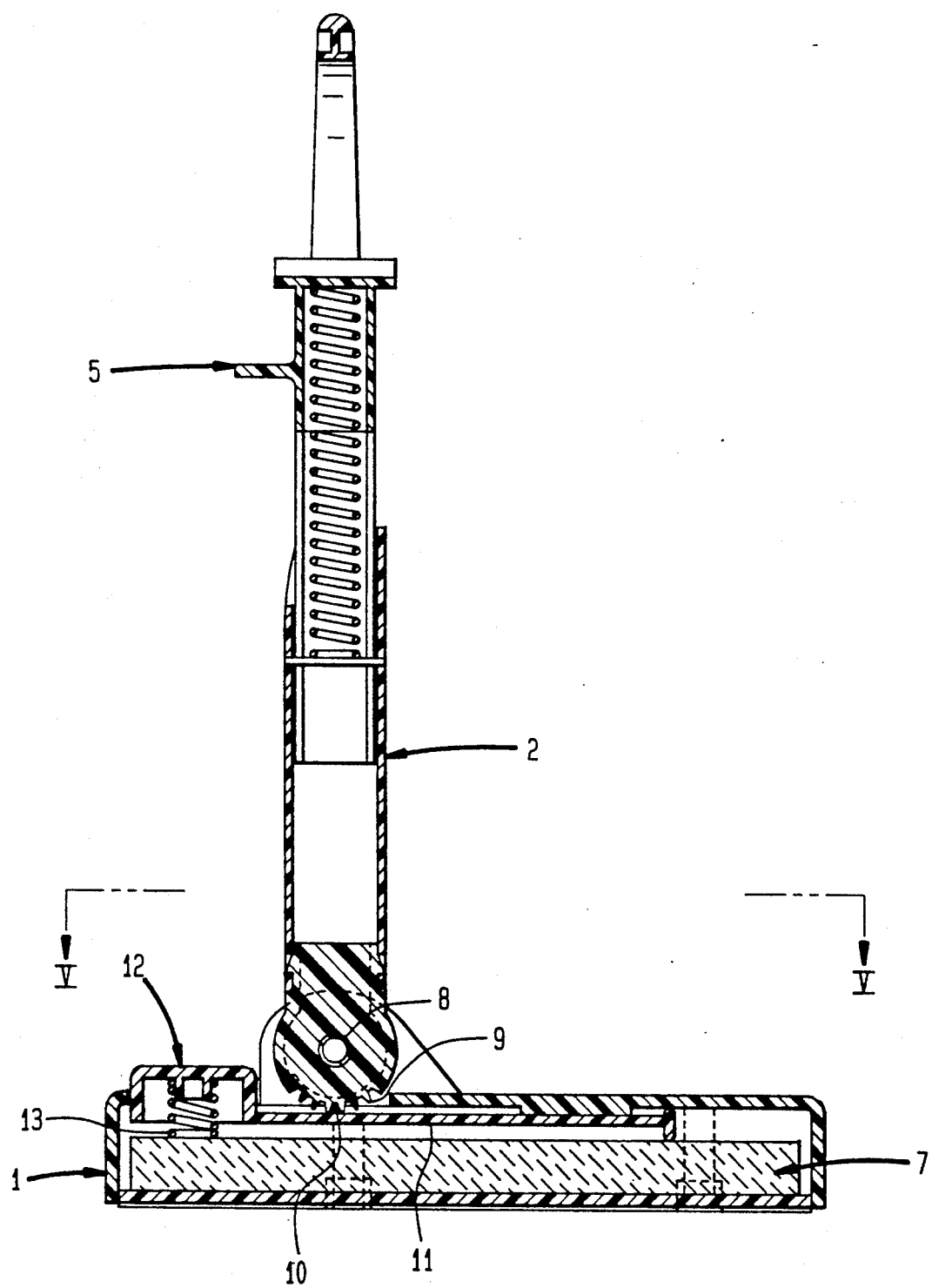
FIG. 4 is a sectional side elevation of the holder on IV—IV of FIG. 2.
Figure 5:
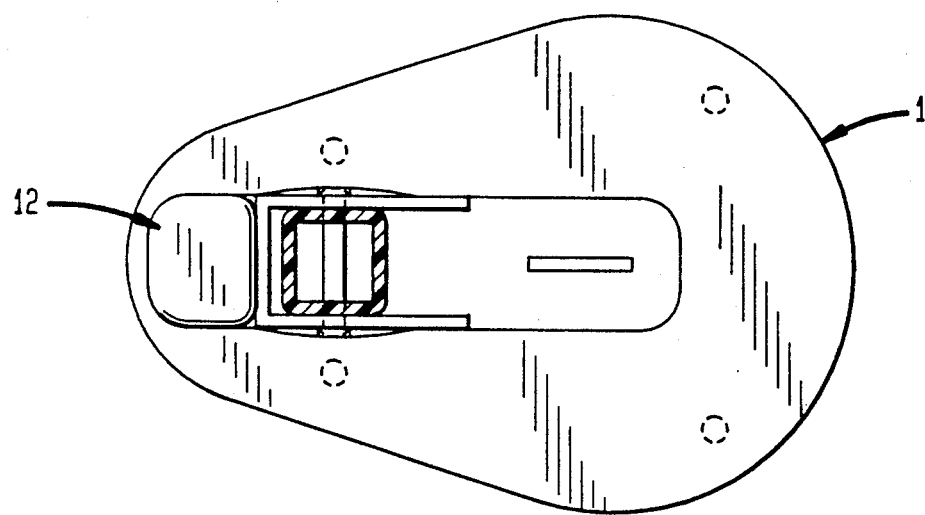
FIG. 5 is a sectional plan view taken on V—V of FIG. 4.
Figure 6:
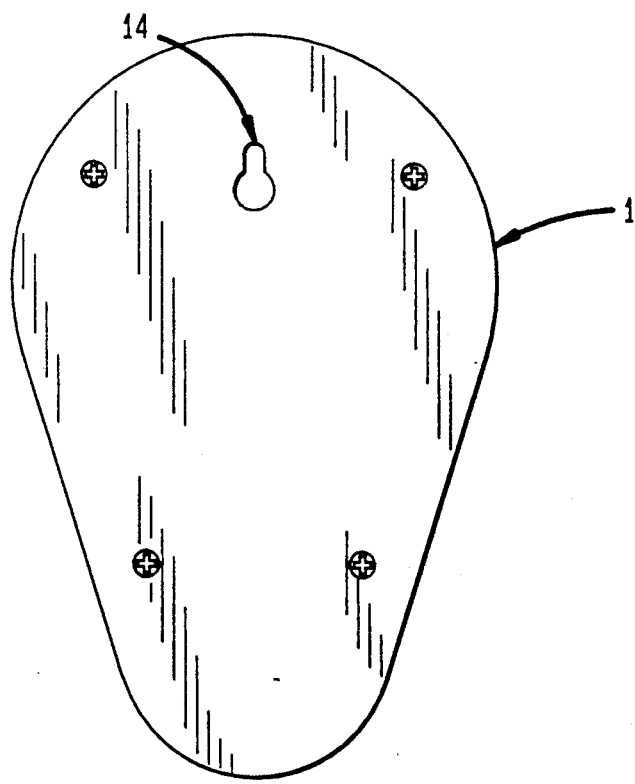
FIG. 6 is an underneath plan view.

FIG. 3 shows the mechanism for varying the inclination. The mechanism comprises a pivot mounting 8 at the lower end of the support arm 2 and a series of teeth 9 projecting downwardly from the lower end of the support arm 2 and meshing with upwardly projecting teeth 10 provided on a generally horizontal member 11 located in the base 1. To adjust the inclination of the support arm 2, button 12 at one end of the horizontal member 11 (the left hand end as seen in FIG. 4) is depressed downwardly against the action of the spring biasing mechanism 13. As a result the upwardly projecting teeth 10 of the horizontal member are moved downwardly out of engagement with the downwardly projecting teeth 9 on the support arm 2, the inclination of the support arm 2 may be reset, and the button 12 is then released and the horizontal member moves 11 upwardly under the action of the spring biasing mechanism so that the teeth 9, 10 again mesh with one another but with the support arm 2 at a different inclination. The support arm 2 may also be folded down completely horizontally for storage or transportation.

While the holder is primarily intended for use in connection with blow dryers it will be appreciated that it may be used for holding a variety of other appliances, for example lamps.

I claim:

1. A holder for a blow dryer or other appliance comprising:

a base;

a support arm extending from the base;

an open frame member on the support arm for receiving the barrel of the blow dryer or other appliance, the internal dimensions of the open frame member being tapered along at least one side thereof;

a gripping arm for projecting into the open frame member towards said tapered side so as to grip the barrel and hold it in position in the open frame member, the gripping arm being retractable to allow insertion of the barrel;

biasing means for biasing the gripping arm towards an external position; and an adjustment mechanism for adjusting the inclination of the support arm.

2. A holder according to claim 1 in which the open frame is coplanar with the support arm and the gripping arm is colinear with the support arm.

3. A holder according to claim 1 in which the base is provided with a weight which serves as ballast to allow the holder to be used in a free standing mode.

4. A holder according to claim 1 in which the base is provided on the lower surface thereof with a key hole shaped slot to facilitate use in a wall mounted mode.

* * * * *